Aug. 29, 1944.  M. COHEN ET AL  2,357,085
METHOD AND MEANS FOR SHEETING AND ELONGATING DOUGH
Filed May 4, 1942
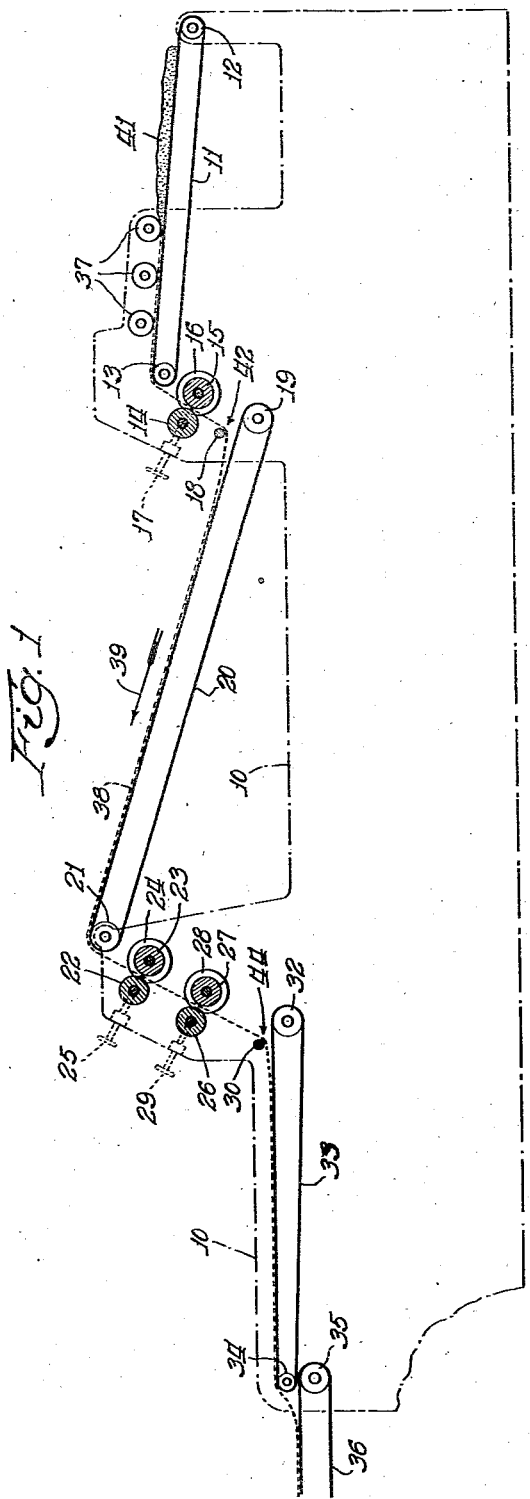
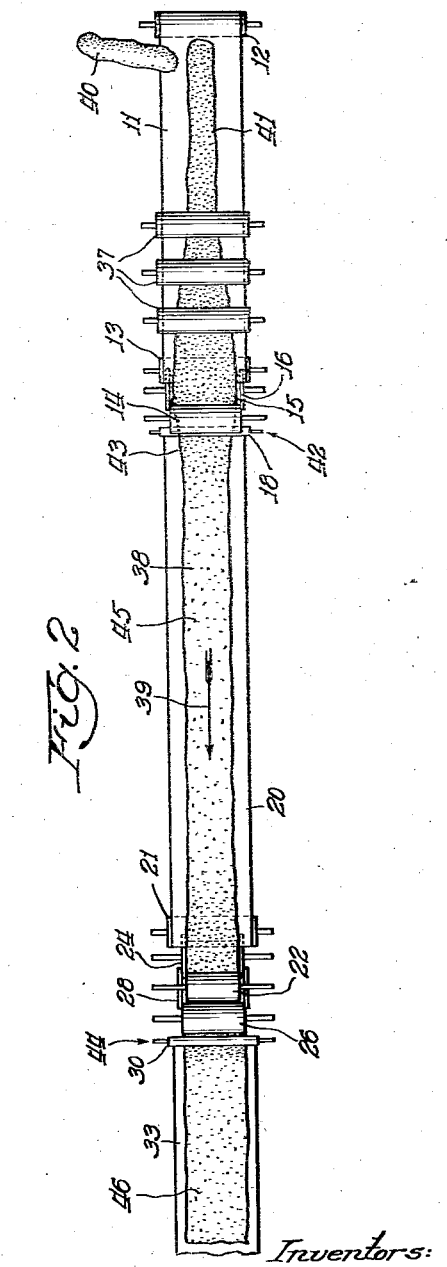
Inventors:
Morris Cohen
Duard W. Enoch
George Hasty and
Gerald A. Jorgenson.
By: A. Trevor Jones
Atty.

Patented Aug. 29, 1944

2,357,085

UNITED STATES PATENT OFFICE 2,357,085

METHOD AND MEANS FOR SHEETING AND ELONGATING DOUGH

Morris Cohen, Kansas City, Mo., and Duard W. Enoch, George Hasty, and Gerald A. Jorgenson, Chicago, Ill., assignors to Interstate Bakeries Corporation, Kansas City, Mo., a corporation of Delaware Application May 4, 1942, Serial No. 441,580

6 Claims. (Cl. 107—54)

This invention relates to method and means for sheeting and elongating dough and among other objects aims to provide improved expedients for this purpose resulting in enhanced continuity and uniformity of the dough strip.

While it has been generally the practice in commercial bakeries in large scale production of bread and other bakery products to sheet the dough preparatory to the forming of individual pieces of dough to produce baked articles, such sheeting has been as a rule, of individual lumps of dough which are sheeted into relatively short lengths coiled on an axis perpendicular to the direction of movement of the dough conveyor.

It has been proposed that the dough might be advantageously sheeted into an elongate and relatively narrow strip, and then this strip coiled on an axis extending more nearly in the direction of movement of the dough strip conveyor so that the strip of dough may be continuous from the place where it is introduced into the sheeting device to the place where it is finally severed into ultimate individual pieces which are ready for baking in that form without further working of the dough. The advantages of this will be apparent in the substantial absence of manual handling of the dough with a minimum of mechanical treatment thereof effecting marked reduction of cost and enhanced volume of output.

An improved method and means for treating the dough strip after it is formed and as above suggested is described and claimed in co-pending application Serial No. 429,764, filed February 6, 1942, which shows the pre-formed elongate strip of dough received on the conveyor which carries it to the coiling roller, and at which point of approach to the coiling roller it is highly desirable that the dough strip should have a substantially uniform width and thickness.

The present invention deals with the preparation of the strip of dough before it arrives at the stage of treatment shown in the said co-pending application, and makes possible, by a novel arrangement and operation of a series of rollers and belts, the control and predetermination of the width and thickness of the strip with a minimum of apparatus and steps of procedure. Among other objects, it aims to produce a continuous strip of dough of substantially uniform predetermined width and thickness by gradually sheeting and elongating the dough in easy stages where the individual rollers may rotate at relatively low speeds, thus effecting a cooler operation while at the same time, because of the continuity of the process and a minimum of mechanical or manual treatment, the output is markedly high. The invention is inclusive of both process and apparatus. It will be explained in connection with and will be readily understood by reference to the accompanying illustrative drawing showing one form of mechanism embodying the herein claimed improvements and novel method steps employed in the practice thereof.

In the drawing, which will be understood are somewhat diagrammatic and illustrate the invention broadly Figure 1 is a side elevational view, partly in section, of a preferred arrangement of rollers and belts as they may be embodied in an improved sheeting and elongating device constructed in accordance with the present invention and facilitating the present improved process; and Figure 2 is a plan view of expedients shown in Fig. 1.

It will be understood that in order to flatten a lump of dough without excessive squeezing or punishing of the dough, it is preferable initially to pass the dough through pressure rollers which while reducing its thickness at the same time increase its width. If the dough is thereafter passed through another pair of pressure rollers, its width will be still further increased and unless one starts with a lump of dough of relatively small diameter the eventual width of the strip so produced might become prohibitive. The alternative is to reduce the width of the dough strip between each pair of pressure rollers so as to permit starting the operation with a lump of dough as it comes out from the dough mixer, for example, and at which time the lump has not been materially reduced in diameter. If it were to be preliminarily reduced materially in diameter at this stage, it would require either a large amount of manual labor or mechanism and too rapid forming of the dough which it is one aim of the present invention to eliminate.

In their broad aspect, the present improvements contemplate the passing of a lump of dough as it comes straight from the mixer, say, after allowing an interval of time for the usual fermentation, along a series of belts and through a series of pressure rollers intercalated with the belts, connecting successive lumps of dough together to effect a continuous and unlimited length of dough, and running the belts and rollers at progressively faster speeds so that as the dough passes successively from a preceding to a succeeding belt or roller, as may be, next in the series of intercalated belts and rollers, it is sheeted and elongated into a strip of unlimited length as may be required, which is successively stretched so as to gradually reduce the strip in width and thickness whereby the desired dimensions are thus imparted to the strip.

In the drawing and referring in detail thereto, the broken line 10 may illustrate diagrammatically any suitable frame or other support for the expedients herein more particularly dealt with and which will now be specifically pointed out.

The starting end, at the right-hand side of the drawing, of the illustrative apparatus may comprise a conveyor such as the endless belt 11 entrained on sunpporting rollers 12 and 13 respectively at opposite ends of the belt 11. Adjacent the discharge end of the belt 11 there is arranged, suitably journalled in the frame 10, a pair of pressure rollers 14 and 15, one of which, as here 15, has at each end a flange 16 which laps the other pressure roller 14. The rollers 14 and 15 are desirably disposed so that the roller 15 is below the discharge end of the belt 11 and a slight distance in advance of the belt supporting roller 13 less than the radius of the roller 15. The roller 14 is set somewhat above the roller 15 and slightly in advance thereof, the distance between the rollers 14 and 15 being adjustable as by any suitable mechanism, indicated at 17, for moving the axis of the roller 14 toward and from the roller 15.

Below the rollers 14 and 15 and somewhat on a line running between the rollers and desirably tangent with the belt supporting roller 13, is arranged an idler roller 18 of relatively small diameter. Slightly back of and below the idler roller 18 is the supporting roller 19 for another endless belt conveyor 20 which latter is inclined upwardly and is supported at its discharge end by a supporting roller 21, the elevation of which is as here shown above that of the supporting roller 13 of the first belt 11.

Similarly arranged with respect to the supporting roller 21 of the belt 20 as the pressure rollers 14 and 15 are with respect to the supporting roller 13, are another pair of pressure rollers 22 and 23, the roller 23 having end flanges 24 which lap the roller 22, these rollers 22 and 23 being arranged with respect one to the other as are the rollers 14 and 15, and a mechanism for adjusting the distance of the roller 22 from the roller 23 being indicated at 25. In this instance still another pair of pressure rollers 26 and 27 are shown arranged similarly to but slightly below and in advance of the pressure rollers 22 and 23, the pressure roller 27 again having end flanges 28 which lap the pressure roller 26 and the distance of the pressure roller 26 being adjustable to and from the pressure roller 27 by mechanism indicated at 29.

Below and slightly in advance of both the pairs of pressure rollers 22—23 and 26—27 is another idler roller 30 of substantially the same diameter as the idler roller 18. Just below and slightly to the rear of the idler roller 30 is shown a supporting roller 32 for still another conveyor belt 33, the discharge end of which is entrained on a supporting roller 34, and immediately below the supporting roller 34 is another supporting roller 35 for a final discharge conveyor belt 36. The supporting roller 34 of the belt 33 is desirably of smaller diameter than the other supporting rollers to reduce the distance between the axes of the rollers 34 and 35.

Preferably a line connecting the axes of each pair of pressure rollers makes an angle of 23½ degrees with the horizontal for enhanced results.

Reverting now to the starting end of the apparatus, the frame 10 may carry a plurality of, in this instance three, successively arranged contact rollers 37 just above the first conveyor belt 11.

It will be understood that suitable power driven mechanism which is not a part of the present invention and which need not be here described, is appropriately provided for driving the conveyor belts and pressure rollers herein referred to so as to cause movement of a strip of dough as indicated by the numeral 38 in the direction of the arrow 39.

The operation of the apparatus just referred to and the method herein described is in one instance as follows:

At the start of the operation as herein shown, which is at the right-hand end of Figs. 1 and 2, lumps of dough such as 40 may be brought to the present apparatus from the dough mixer and may be manually placed on the first conveyor belt 11. As successive such lumps are brought to the apparatus they may have their ends manually kneaded together, as is well known in the bread making art, to form a continuous somewhat elongate initial mass 41 disposed on the conveyor belt 11 and ready to be processed as herein described by movement from right to left of the figures of the drawing as indicated.

While still on the conveyor belt 11 and moving with the conveyor belt, the initial somewhat irregular but also slightly elongate dough mass 41 of relatively great thickness travels under the contact rollers 37 which may be vertically adjustable in their bearings in the frame 10, as is well known in the art, and turning by frictional contact with the dough begin a flattening thereof while the dough passes thereunder on the belt 11. As the somewhat flattened and widened dough strip drops off the conveyor belt 11, its initial end is just in position to enter the space between the first pair of pressure rollers 14—15. In accordance with the present invention, the peripheral speed of the pressure rollers 14—15 is desirably faster than the linear speed of the conveyor 11.

The dough strip 38 then passes under the idler roller 18 and onto the next conveyor belt 20, where its direction of movement is sharply changed as at 42. In accordance with the present invention, the upper run of the conveyor belt 20 is arranged to move in the direction of the arrow 39 at a speed greater than the peripheral speed of the pressure rollers 14—15 and thus greater than the speed of the dough strip as it emerges from this first pair of pressure rollers. Consequently, just back and forward of the point 42, the dough strip is desirably stretched to reduce its width and thickness as indicated at 43 (Fig. 2) from the previous width of the dough strip which was determined by the pressure rollers 14 and 15. The rather sharp change at 42 in the direction of the dough strip, already referred to, as it passes about the idler roller 18, facilitates the stretching and narrowing of the strip.

The dough strip now passes upwardly on the conveyor belt 20 until it drops off the upper discharge end of that belt and into the space between the pressure rollers 22—23 and also passes between the pressure rollers 26—27. The pressure rollers 22—23 and 26—27 desirably run at a peripheral speed faster than the linear speed of the belt 20 and the pressure rollers 26—27 faster than the pressure rollers 22—23.

As indicated at 44, the dough strip next passes around the idler roller 30, where its direction is again somewhat sharply changed to pass onto the upper run of the conveyor belt 33. Here, again, this conveyor belt is desirably arranged to run at a speed slightly in excess of the peripheral speeds of the pressure rollers 22—23 and 26—27 so as to maintain a tension on the dough and prevent bunching or wrinkling thereof.

It will be understood that the adjusting devices 17, 25 and 29 may be arranged so as to give the dough strip the desired thickness and that the speeds of the belts 20 and 33 and particularly of the belt 20 may be adjusted, by conventional speed control mechanism for these belts, to give the dough strip a desired width, in accordance with the present invention. For example, the belt 11 may have a linear speed of 88 inches a minute and the pressure rollers 14—15 a peripheral speed of 264 inches per minute. The thickness of the dough strip as it emerges from the pressure rollers 14—15 may be, say, ⅜ of an inch, and its width, say, 8 to 10 inches. The linear speed of the conveyor belt 20 may be 428 inches per minute, and the dough strip thus materially stretched as it leaves both the belt 11 and the idler roller 18 to be received on the conveyor belt 20, this stretching reducing the width of the strip to say just slightly under 6 inches as at 45 and its thickness to about ¼ inch. As the dough strip passes between the pressure rollers 22—23 it is maintained at a width of about 6 inches, this being the distance between the flanges 24, its thickness being reduced to about $\frac{3}{16}$ of an inch. Again, as the dough strip passes between the pressure rollers 26—27 its thickness is slightly further reduced to say ⅛ of an inch and its width slightly further increased to say 8 inches, this being the distance between the flanges 28. The final dimensions of the dough strip, as at 46, may be desirably substantially 8 inches for its width and approximately ⅛ inch for its thickness. The linear speed of the conveyor belt 33 may be about 687 inches per minute, while the peripheral speed of the pressure rollers 22—23 is about 527 inches per minute and of the pressure rollers 26—27 is about 615 inches per minute.

Since the peripheral speed of the pressure rollers 14—15 is three times the linear speed of the belt 11 considerable stretching of the dough strip occurs between the end of the belt 11 and the pressure rollers 14—15, and again since the linear speed of the conveyor belt 20 is materially faster than the peripheral speed of the pressure rollers 14—15, further stretching occurs as the dough strip 38 passes around the idler roller 18. Thus maximum stretching of the dough occurs in the vicinity of the pressure rollers 14—15. From there on, while some stretching advantageously occurs, or at least a successive tensioning of the dough strip, the acceleration is advantageously decreased. Thus the peripheral speed of the pressure rollers 22—23 is only a fraction greater than the liner speed of the belt 20, the peripheral speed of the pressure rollers 26—27 is again only a fraction greater than the peripheral speed of the pressure rollers 22—23, and the linear speed of the conveyor belt 33 is only a trifle greater than the peripheral speed of the pressure rollers 26—27, so that the forming and establishing stage of the strip is done by the mechanism at the left-hand end of the drawing, at which point the dough strip fills the pressure rollers as determined by the respective flanges 24 and 28 already referred to, the distance between the flanges 24 being 6 inches and the distance between the flanges 28 being 8 inches, the final desired width of the strip in the example here given.

As the dough strip passes onto the final discharge conveyor belt 36, the speed is at this stage slightly reduced to say approximately 480 inches per minute or about 40 feet per minute, which causes some slight slowing up of the now formed strip, the dimensions of which have been uniformly predetermined, which adapts it to enter the device shown in the above-referred to copending application Serial No. 429,764 and to cooperate in making possible a continuous operation of the latter, at approximately a speed such as that mentioned, and with the final dimensions of width 8 inches and thickness ⅛ inch.

Bread or roll doughs have considerable elasticity and when stretched the strain on the dough is substantially uniform at all points. It is desirable that the sheeting and elongating processes be done in gradual easy stages both so that the dough will not break or tear and also so that it will retain the desired shape and dimensions given to it. Furthermore, it is advantageous that a settling period be given the dough between its periods of flattening and stretching, for any strains set up in the dough to be relaxed before it enters another stage of flattening or stretching. The conveyor belt 20 provides such a rest period for the dough and it also effects a certain amount of both first slippage and then friction between the belt and the dough, the belt being advantageously of a not too smooth canvas for this purpose. Again, the upward slope of the belt 20 provides height for the next pressure roller stage so that the dough reaches the final belt 36 at a normal working elevation. The idler roller 18, for example, serviceably further maintains a substantially constant point of contact between the dough and the belt 20, which would be difficult if not impossible to maintain if the dough passed directly from the preceding pressure rollers to the stretching belt.

The driving mechanism for the belt 11 and the pressure rollers 14—15 is desirably so co-ordinated that by a common control the absolute speeds of these devices may be increased or decreased while maintaining their relative speeds already referred to. Similarly the driving mechanism for the conveyor belt 20, pressure rollers 22—23, pressure rollers 26—27 and conveyor belt 33 are similarly co-ordinated so that by a common control their absolute speeds may be increased or decreased while maintaining their relative speeds as already referred to. This latter unitary arrangement may also include the discharge belt 36.

In such a continuous process as here described, the dough strip may be produced, i. e., in connected increments passing through the steps and expedients shown for a total indefinite length, say even as much as several miles, or sufficient to take care of an entire day's output of a large commercial bakery, with enhanced speed and economy of operation.

As so constructed and arranged the idler rollers 18 and 30 are on the inner side of the angle formed by the dough strip passing from the pressure rollers to the next succeeding conveyor.

Having described the invention, what is claimed is:

1. In means for sheeting and elongating dough to produce a continuous relatively narrow flat strip of predetermined width and thickness, the combination, with a pair of pressure rollers which partially flatten and partially elongate the dough, of a belt conveyor having its receiving end arranged below said pressure rollers and inclined upwardly therefrom, a second pair of pressure rollers arranged slightly below the delivery end of said conveyor belt, a second conveyor belt having its receiving end arranged slightly below the second pair of pressure rollers, an idler roller arranged between each of said pairs of pressure rollers and the next succeeding conveyor belt on the inner side of the angle formed by the dough strip passing from the pressure rollers to the conveyor belt and contacting the dough strip, said conveyor belts and pressure rollers being arranged to be operated whereby each succeeding belt or pair of pressure rollers is run at a somewhat faster speed than the next preceding belt or pair of pressure rollers but whereby the increments of speed are successively reduced.

2. In means for sheeting and elongating dough, the combination of pressure rollers for receiving the dough therebetween partially to flatten and partially to elongate the dough to produce a continuous relatively narrow flat dough strip, a belt conveyor receiving the dough strip from the pressure rollers, said belt conveyor having its receiving end arranged below said pressure rollers and being inclined upwardly therefrom at an angle approximating a right angle with respect to the direction of the dough strip passing through the pressure rollers, and an idler roller between the pressure rollers and the conveyor on the inner side of the angle formed by the dough strip passing from the pressure rollers to the conveyor and contacting the dough strip, whereby the direction of travel of the dough strip is sharply changed when passing around said idler roller from the pressure rollers to the conveyor, the conveyor being arranged to be operated at a linear speed in excess of the peripheral speed of the pressure rollers.

3. In means for sheeting and elongating dough, the combination of pressure rollers for receiving the dough therebetween partially to flatten and partially to elongate the dough to produce a continuous relatively narrow flat dough strip, a conveyor receiving the dough strip from the pressure rollers, said conveyor having its receiving end arranged below said pressure rollers and being inclined sharply upwardly therefrom, an idler roller between the pressure rollers and the conveyor on the inner side of the angle formed by the dough strip passing from the pressure rollers to the conveyor and contacting the dough strip, whereby the direction of travel of the dough strip is sharply changed when passing around said idler roller from the pressure rollers to the conveyor, said conveyor being arranged to be operated at a linear speed in excess of the peripheral speed of the pressure rollers, whereby the dough strip is elongated as it leaves the idler roller and is reduced in width.

4. In means for sheeting and elongating dough, the combination of pressure rollers for receiving the dough therebetween to produce a continuous dough strip, a conveyor receiving the dough strip from the pressure rollers, said conveyor having its receiving end arranged below said pressure rollers and being arranged on an angle to the dough strip emerging from the pressure rollers, an idler roller between the pressure rollers and the conveyor on the inner side of the angle formed by the dough strip passing from the pressure rollers to the conveyor and contacting the dough strip, whereby the direction of travel of the dough strip is sharply changed when passing around said idler roller from the pressure rollers to the conveyor, said conveyor being arranged to be operated at a linear speed in excess of the peripheral speed of the pressure rollers.

5. The method of the character described which comprises the steps of partially sheeting and elongating a lump of dough to form a continuous relatively narrow flat dough strip on a line extending and with the dough strip moving downwardly and somewhat forwardly, moving the dough strip forwardly while changing the direction of movement thereof on an angle approximating a right angle and with the dough strip extending upwardly and forwardly, the dough strip being caused to move upwardly and forwardly at a substantially faster rate than its said downward movement, whereby a continuous dough strip of relatively uniform width and thickness is produced for baking purposes.

6. The method of the character described which comprises the steps of partially sheeting and elongating a lump of dough to form a continuous relatively narrow flat dough strip on a line extending and with the dough strip moving downwardly, moving the dough strip forwardly while changing the direction of movement thereof on an angle approximating a right angle, the dough strip being caused to move forwardly at a substantially faster rate than its said downward movement, and predetermining said relative speeds whereby a continuous dough strip of relatively uniform width and thickness is produced for baking purposes.

MORRIS COHEN.
DUARD W. ENOCH.
GEORGE HASTY.
GERALD A. JORGENSON.